United States Patent

Morris et al.

[11] Patent Number: 5,840,112
[45] Date of Patent: Nov. 24, 1998

[54] METHOD AND APPARATUS FOR PRODUCING TITANIUM DIOXIDE

[75] Inventors: A. J. Morris, Oklahoma City, Okla.; J. C. Magyar, Ackerman; G. D. Wootten, Columbus, both of Miss.; W. A. Yuill, Edmond, Okla.

[73] Assignee: Kerr McGee Chemical Corporation

[21] Appl. No.: 687,280

[22] Filed: Jul. 25, 1996

[51] Int. Cl.⁶ ................................................ C09C 1/36
[52] U.S. Cl. ...................... 106/442; 106/437; 423/613
[58] Field of Search .............................. 106/437, 442; 423/613

[56] References Cited

U.S. PATENT DOCUMENTS

| | | | |
|---|---|---|---|
| 2,437,171 | 3/1948 | Pechukas | 106/442 |
| 3,340,008 | 9/1967 | Nelson | 106/42 |
| 3,449,076 | 6/1969 | Monroe | 106/437 |
| 3,486,913 | 12/1969 | Zirngibl | 106/437 |
| 3,512,219 | 5/1970 | Stern et al. | 423/219 |
| 3,615,202 | 10/1971 | Stern et al. | 106/442 |
| 3,647,377 | 3/1972 | Hilgers et al. | 423/613 |
| 3,661,522 | 5/1972 | Colombo et al. | 106/437 |
| 4,013,782 | 3/1977 | Powell et al. | 423/613 |
| 4,214,913 | 7/1980 | Glaeser | 106/437 |
| 4,803,056 | 2/1989 | Morris et al. | 423/613 |
| 5,196,181 | 3/1993 | Hartmenn | 106/437 |
| 5,204,083 | 4/1993 | Magyar et al. | 106/437 |
| 5,372,639 | 12/1994 | Gonzalez et al. | 106/437 |
| 5,599,519 | 2/1997 | Haddow | 423/613 |

*Primary Examiner*—Mark L. Bell
*Assistant Examiner*—Scott L. Hertzog
*Attorney, Agent, or Firm*—Herbert M. Hanegan; Charles L. Warner, II; J. Rodgers Lunsford, III

[57] ABSTRACT

A process for reacting titanium tetrachloride vapors with oxygen including a first oxygen preheat assembly for preheating oxygen to a first predetermined temperature and a titanium tetrachloride preheat assembly for preheating titanium tetrachloride to a relatively low, temperature. The process includes adding a second oxygen preheat assembly for preheating oxygen to a second temperature substantially below the first temperature, and includes a second reaction zone adapted for receiving the mixture from the first reaction zone, the oxygen at the second temperature being reacted with the titanium tetrachloride in the mixture from the first reaction zone to produce titanium dioxide. Also provided is a process for the preparation of titanium dioxide comprising reacting titanium tetrachloride with oxygen at an elevated pressure and at a temperature above about 1750° F. wherein oxygen is introduced into the reactor in at least two points, the titanium tetrachloride introduced being previously admixed with aluminum chloride and has been heated to a temperature of less than about 450° F. by utilizing the heat of reaction of aluminum and chlorine.

27 Claims, 3 Drawing Sheets

SCHEMATIC FOR OXYGEN FLOW FOR SECONDARY OXYGEN TEST

METHOD AND APPARATUS FOR PRODUCING TITANIUM DIOXIDE

BACKGROUND OF THE INVENTION

The present invention relates to a process for producing titanium dioxide by reacting titanium tetrachloride vapors with oxygen and to an improved reactor for use in such a system.

It is well-known that titanium tetrachloride reacts with oxygen in the vapor phase to form titanium dioxide and that this reaction is initiated by heating the reactants to a suitable temperature. However hot titanium tetrachloride is highly corrosive and therefore many useful materials of construction for heat exchangers used to heat titanium tetrachloride are rapidly corroded. In practice this generally imposes an upper limit of about 752° F. on the temperature to which titanium tetrachloride can be heated by conventional heat exchangers.

A suitable temperature for the reactants (oxygen and titanium tetrachloride) is about 1742° F. and, in order to achieve this temperature in known processes, the oxygen feed must be heated sufficiently to compensate for the above-mentioned relatively low titanium tetrachloride temperature. Frequently this high temperature for the oxygen feed is achieved by adding a fuel to the oxygen as it is introduced into the oxidation reactor or by heating with an electrical discharge. However, the use of these methods of heating introduces unwanted impurities such as, for example, carbonaceous residues from the fuel or metallic impurities from the electrodes used for the electrical discharge.

SUMMARY OF THE INVENTION

According to the invention a process for the production of titanium dioxide comprises reacting titanium tetrachloride with oxygen at a pressure above atmospheric pressure and at a reaction temperature of at least about 1292° F. in an oxidation reactor, the oxygen being introduced into the reactor at a first inlet point and at least one further inlet point. Optionally, the titanium tetrachloride may be introduced as a mixture with aluminum chloride and being heated to a temperature of at least about 662° F., the aluminum chloride being formed by reaction of aluminum and chlorine and the heat generated by this reaction being used to heat the titanium tetrachloride.

DESCRIPTION OF THE PREFERRED EMBODIMENTS

Titanium dioxide, which is useful as a pigment, is produced on a commercial scale by reacting titanium tetrachloride vapor with oxygen. In one commercial process, a preheated oxidizing gas is passed into a reaction zone and preheated titanium tetrachloride vapor is passed into the same reaction zone where the titanium tetrachloride vapor is reacted with the oxygen contained in the oxidizing gas according to the following reaction:

$$TiCl_4 + O_2 \rightarrow TiO_2 + 2Cl_2$$

In such a prior art process the combined temperature of the reactants (titanium tetrachloride and oxygen), before reaction, had to be at least about 1600° F. in order to sustain the oxidation reaction and, preferably, the combined temperature of the reactants was between about 1650° F. and about 1800° F. In one process, the oxidizing gas was preheated for introduction into the reaction zone to a temperature of about 1800° F. and titanium tetrachloride vapor was preheated for introduction into the reaction zone to a temperature of about 1750° F.

Titanium tetrachloride vapors at relatively high temperatures of about 1750° F. are highly corrosive and, thus, the preheating equipment utilized for preheating such titanium tetrachloride vapors is extremely expensive. It is therefore desirable to develop a system for producing titanium dioxide by reacting titanium tetrachloride vapor with oxygen utilizing titanium tetrachloride vapors preheated to minimum temperature levels, such as below about 752° F. since this would permit the utilization of less expensive equipment for preheating the titanium tetrachloride.

A reactor of the type utilized in the process for producing titanium dioxide by reacting titanium tetrachloride vapor with oxygen as described above was disclosed in U.S. Pat. No. 3,512,219, issued to Stern, and the configuration with a dual slot oxidizer (DSO) in Morris, et al. U.S. Pat. No. 4,803,056, both specifically incorporated herein by reference.

In this prior process, pure oxygen was heated in a metal alloy tube furnace. In one embodiment, oxygen could only be heated to a maximum temperature of about 1800° F. due primarily to the thermal efficiency and the materials of construction of the oxygen preheating apparatus. Thus, in this process, titanium tetrachloride vapors also had to be heated to a temperature of about 1800° F. in the titanium tetrachloride vapor preheating apparatus. In the alternative, additional oxygen preheating equipment might be added to the existing oxygen preheating equipment in an effort to elevate the oxygen temperature to a level above 1800° F., thereby permitting the utilization of titanium tetrachloride vapors which have been preheated to lower temperature levels, below 1800° F. However, the additional oxygen preheating equipment represents a substantial expense which might not be offset by any savings in the titanium tetrachloride vapor preheating apparatus resulting from the lower temperature requirements for the titanium tetrachloride vapors.

In the above process, the titanium tetrachloride vapor preheating equipment utilized silica pipe for the containment of the highly corrosive titanium tetrachloride vapors. The size of the silica pipe was limited to a maximum of about six inches because of manufacturing techniques suitable for producing a relatively flawless silica pipe. Also, the strength and integrity of welded silica pipe joints decrease with increasing diameters and breakage is more probable with higher diameter silica pipes. A primary problem with silica is the failure rate. The maximum permissible pressures within the silica pipe decreases with increasing diameters and above six inch diameter silica pipes might result in working pressures insufficient to efficiently drive the titanium tetrachloride vapors downstream from the titanium tetrachloride vapor preheating equipment.

Auxiliary fuel normally is added upstream of the titanium tetrachloride oxygen reactor. Injection of auxiliary fuels, such as carbon monoxide and methane, directly into the reactor to stabilize the flame in the reactor has been suggested as a means for lowering the temperature level requirements for the titanium tetrachloride vapors, thereby increasing the capacity of existing titanium tetrachloride vapor preheating equipment, i.e., the silica pipe preheaters. However, this approach leads only to minor reduction in the temperature required for the titanium tetrachloride vapors, such reduction being in the range of about 200° F. to about 500° F. Thus, the titanium tetrachloride vapors still would have to be preheated to significantly high temperatures where titanium tetrachloride corrosion problems still would exist. In addition, the combustion products from the reactor utilizing this approach dilute the chlorine recycle gas and result in larger capacity downstream equipment being required to process the increased gas load.

The present invention determined that a second addition of oxygen after a first addition of oxygen has reacted with a portion of the $TiCl_4$ present (secondary oxygen) can be used to improve the properties of raw pigment so that finished pigments with more positive tint tones can be produced. The use of secondary oxygen involves diverting some of the oxygen from the front of the oxidizer to a position behind the $TiCl_4$ injection slot(s). Rutilization did improve with hot oxygen as much as criteria for rutilization was lower. Tests performed using a hot secondary oxygen flow that was split using orifice plates produced pigments with much more positive tint tones, but since the relative oxygen flows were controlled by orifice plates it was difficult to control each $O_2$ flow so as to control particle size. One test performed regulated the oxygen flows while the oxygen was still cold and then heated each stream to the desired temperature. This test allowed for independent control of the volume and temperature of each gas stream. Increasing tint tone and reducing aggregation also decreases oil adsorption and dispersant demand and increases gloss for finished pigments. A pigment with a more positive tint tone can be produced by using secondary oxygen. Diverting some of the oxygen going to the front of the oxidizer to a position behind the $TiCl_4$ slot(s) indicates that pigments with acrylic tint tones as high as about −3.2 can be made using secondary oxygen.

Figure 1:
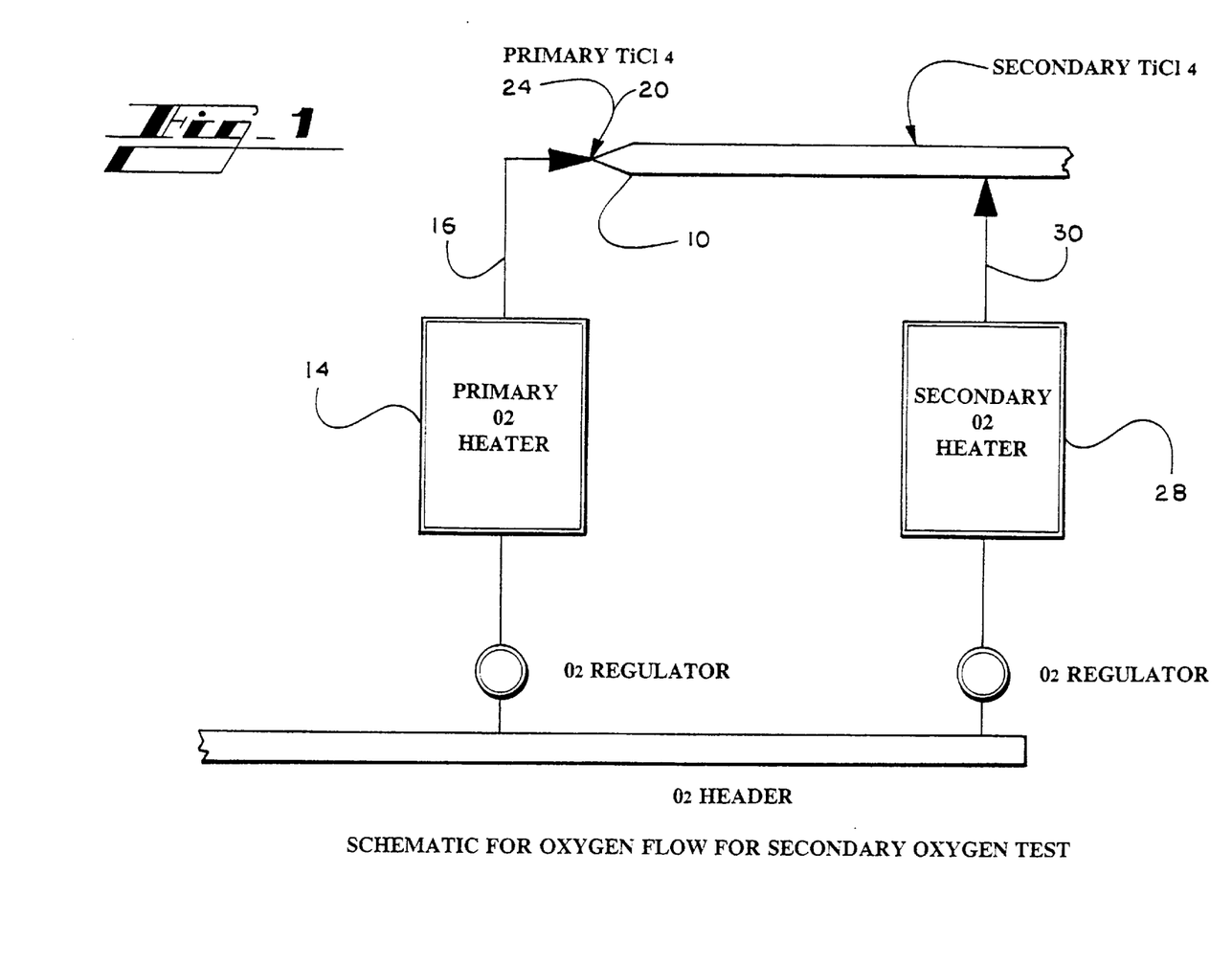
FIG. 1 is a diagrammatic view of the equipment for preheating oxygen for introduction into the reaction zones in the reactor.

Shown in FIG. 1 is a schematic for the primary and secondary $O_2$ flows constructed in accordance with the present invention for use in a process for producing titanium dioxide by vapor-phase oxidation of titanium tetrachloride. In general, the reactor 10 comprises: a first oxidizing gas introduction assembly which is adapted to received oxygen from oxygen preheat equipment 14 by way of a flowline 16 and pass the oxygen at a first elevated temperature into a first reaction zone formed in the reactor 10; a titanium tetrachloride vapor introduction assembly 20 which is adapted to receive titanium tetrachloride vapor at an elevated temperature from titanium tetrachloride preheat equipment by way of a flowline 24 and to pass the titanium tetrachloride vapor at the elevated temperature into the first reaction zone 18; and a second oxidizing gas introduction assembly which is adapted to receive oxygen at a second temperature, substantially less than the first temperature, from second oxidizing gas preheat equipment 28 by way of a flowline 30 and to pass oxygen at the second temperature into a second reaction zone, the mixture from the first reaction zone being passed into the second reaction zone for reacting with oxygen at the second temperature which simultaneously is being passed into the second reaction zone.

Oxygen preheat equipment 14 is constructed to heat the primary oxygen to a temperature level of about 1750° F., advantageously from about 1500° F. to about 1800° F. Oxygen preheat equipment 28 advantageously heats the secondary oxygen to about 700° F. Such oxygen preheat equipment is commercially available and is well known in the art.

In a preferred embodiment, titanium tetrachloride preheat equipment heats titanium tetrachloride vapors to a temperature of about 350° F., and then heats the titanium tetrachloride to a temperature of less than about 800° F., preferably less than about 750° F., before injection into the reactor. Such titanium tetrachloride preheat equipment is commercially available and is well known in the art. In one embodiment, for example, the titanium tetrachloride is heated and vaporized in a shell-and-tube type heat exchanger operating at a temperature of about 350° F. One type of heater is a shell-and-tube heat exchanger with a u-shaped tube bundle of nickel and glass-lined carbon steel sheet. The tube-side heating medium normally is steam, but may, at temperatures approaching 400° F., be some other heat transfer fluid such as Dow-therm, should suitable steam pressure be unavailable. One silica pipe heater which is useful for receiving titanium tetrachloride at about 400° F. is a tubular radiant-heat furnace with vertical silica pipe.

In this embodiment, the second oxidizing preheat equipment 28 is constructed to preheat oxygen to a second temperature of from more than about 500° F. to less than about 1600° F., advantageously from about 550° F. to about 700° F. The secondary oxygen can be heated in the same type of heat exchanger employed in the primary oxygen heat step described above.

In a preferred embodiment, assuming a capacity of 100 tons per twenty-four hour period of titanium dioxide produced utilizing reactor 10, the first flow of oxygen gas into the oxidizing gas introduction assembly and through the reactor 10 is about 60 pound per mole per hour, the flow of titanium tetrachloride level into the titanium tetrachloride introduction assembly 20 and through the reactor 10 is about 104 pound mole per hour and the flow of oxygen at the second temperature into the second oxidizing gas introduction assembly and through reactor 10 is about 60 pound per mole per hour. In this embodiment, about one pound mole per hour of oxygen together with two hundred pounds per hour of sand are passed through the injection tube.

In operation, oxygen is preheated in oxygen preheat equipment 14 to the predetermined temperature and then passed at a controlled, predetermined rate through flowline 16 to the oxidizing gas introduction assembly and passes into the first reaction zone.

Titanium tetrachloride is preheated in titanium tetrachloride preheat equipment to a predetermined temperature and passed through flowline 24 at a controlled rate into titanium tetrachloride introduction assembly 20 and into the first reaction zone, where oxygen at the first temperature and titanium tetrachloride react to produce a mixture including particles of titanium dioxide, this mixture being passed downstream into a second reaction zone.

Oxygen is preheated in second oxidizing gas preheat equipment 28 to predetermined second temperature and passed at a controlled rate through flowline 30 into the second oxidizing gas introduction assembly and into the second reaction zone, where oxygen at the second temperature reacts with the titanium tetrachloride in the mixture passed from first reaction zone to produce a mixture including additional titanium dioxide, the mixture from second reaction zone being passed downstream for further processing in a manner known in the art of producing titanium dioxide by vapor phase oxidation of titanium tetrachloride.

In order to react oxygen and titanium tetrachloride vapors in a manner which ensures rutile as the dominant phase in titanium dioxide product, the temperature in the reaction zones must be above a minimum temperature level of about 2200° F.

The combined temperature of the reactants, prior to reaction, to produce the required reactions, must be at least 1600° F. to sustain the oxidation reaction and preferably, the combined temperature of the reactants, before reaction, should be in the range of from about 1650° F. to about 1800° F. In one operational process for producing titanium dioxide by vapor-phase oxidation of titanium tetrachloride, oxygen is preheated to a temperature level of about 1800° F. and titanium tetrachloride is preheated to a temperature level of above about 1750° F. In this process, oxygen and titanium tetrachloride vapors are reacted in a reaction zone utilizing a reactor like that disclosed in Stern, et al., U.S. Pat. No. 3,512,219 to produce a mixture including some titanium dioxide, and the mixture consisting of unreacted $TiCl_4$ and $O_2$ and reaction products is passed downstream for further processing.

Secondary oxygen is believed to control particle size by controlling the rate of rutilization. The mechanisms considered to be effective in developing the process described were proposed by Suyama (Y. K. Suyama, K. Ito, A. Kato, "Mechanism of Rutile Formation in Vapor Phase Oxidation of $TiCl_4$ by Oxygen," *Inorg. Nucl. Chem*, Vol. 37, (1975) pp. 1883–1888), and by Shannon and Pask ("F*A*C*T*" computer program developed by C. W. Bale, A. W. Pelton and W. T. Thompson, offered through McGill University and Ecole Polytechnique, Montreal, Quebec, Canada). According to Suyama, the amount of the rutile phase seeded in growing pigment particles is determined by conditions at the time the particles are nucleated and, according to Shannon and Pask (D. R. Shannon, J. A. Pask, "Kinetics of Anatase—Rutile Transformation" *J. Am. Ceram Soc.,* Vol. 48(8), (1965), pp. 391–398), the time required for the particles to become converted to rutile is dependent upon the amount of rutile seeded into the particles during nucleation and the temperature the particles are exposed to during growth. Particles are also growing by coagulation and coalescence at the same time they are being converted to rutile. Data reported by George (A. P. George, R. D. Murley, E. R. Place, "Formation of TiO2 Aerosol from Combustion Supported Reaction of $TiCl_4$ and $O_2$," *Fordam Symposia of the Chemical Society,* No. 7 Fogs and Smokes (28th, 29th, 30th Mar. 1973)), indicated that anatase is very easy to coalesce but test work indicates rutile is difficult to coalesce at the temperatures experienced in an oxidizer. Consistent with this data, it is generally observed that increased temperature and the addition of rutilization agents such as alumina and water increased rutile content and simultaneously decreased particle size and increased agglomeration. On the basis of this data, it appeared possible that the properties of the raw pigment could be controlled more precisely by controlling the conditions in the region of the oxidizer where the pigment particles were nucleated. Suyama's work suggested that the concentration of $TiCl_4$ in the region of the oxidizer where nucleation occurs could be used as a means of controlling particle size and other properties of raw pigment.

Figure 2:
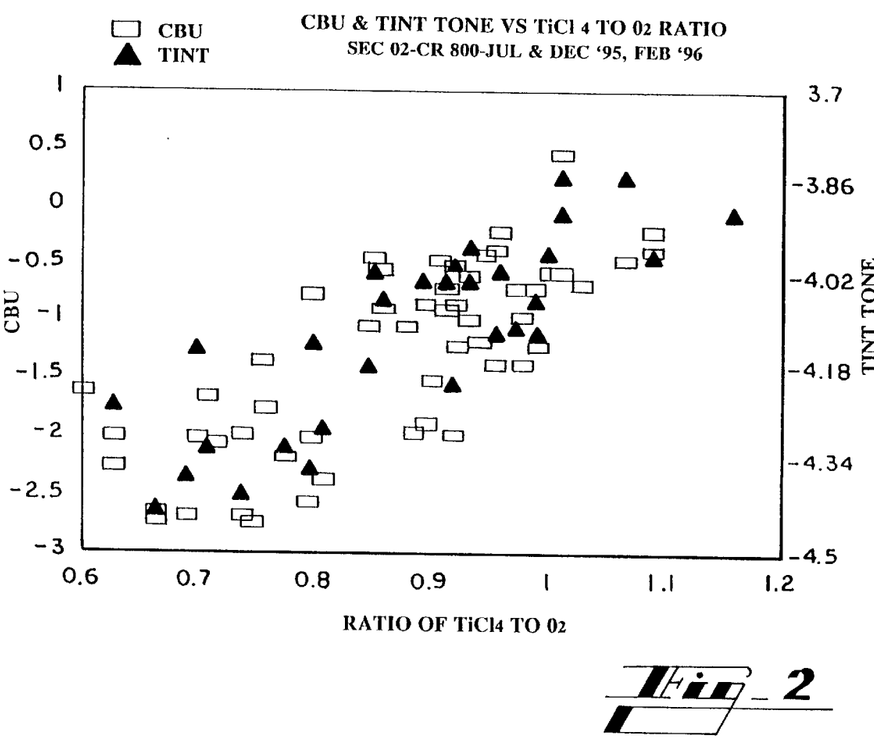
FIG. 2 is a graph showing the relationship of CBU and tint tone vs. TiCl$_4$ to O$_2$ ratio.
Figure 3:
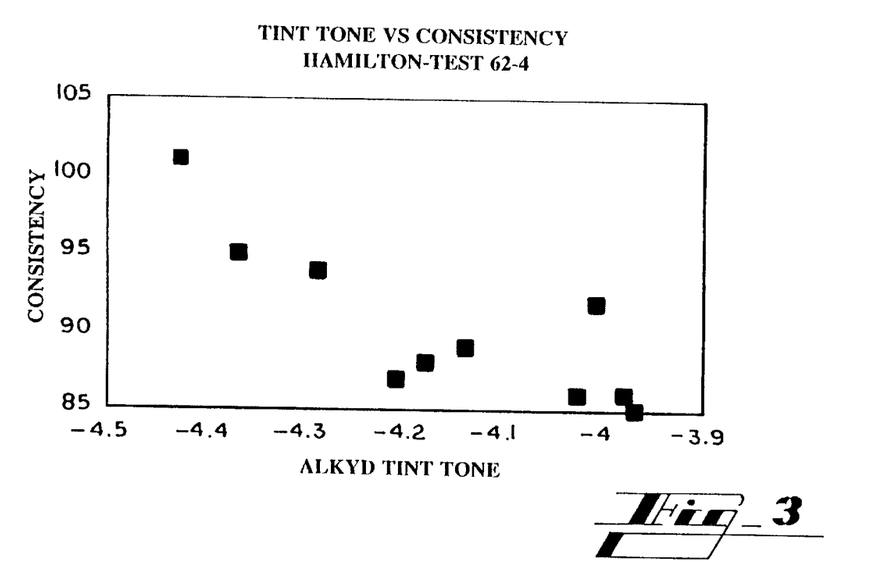
FIG. 3 is a graph showing tint tone vs. consistency.

The possibility of controlling raw pigment properties using $TiCl_4$ concentration was tested using the oxidizer configuration shown in FIG. 1. An oxidizer was designed so that the ratio of $TiCl_4$ to $O_2$ could be controlled by changing the rate of flow of oxygen in the front of the oxidizer. FIG. 2 is a plot showing how raw pigment CBU and finished pigment alkyd tint tone could be controlled by controlling the ratio of $TiCl_4$ to $O_2$ added at the front of the oxidizer. It is necessary to always provide enough $O_2$ to react completely with the $TiCl_4$ added so a second addition of $O_2$ maybe necessary. Consistent with the patent of Morris, the oxidizer may also have one or more $TiCl_4$ injection slots. The significant discovery was that the most important variable in controlling pigment size was the ratio of $TiCl_4$ to $O_2$ in the region where nucleation is occurring. The data shown in FIG. 2 was collected with three different configurations of the oxidizer. The different positions for addition of the oxygen required to oxidize all of the $TiCl_4$ is shown in FIG. 3. The CBU of the raw pigment, a measurement of particle size, within the uncertainty of measuring reactant volumes and CBU appears to be largely dependent on the ratio of $TiCl_4$ in the region of the oxidizer where nucleation occurs. The properties of the finished pigments are also affected by varying the ratio of $TiCl_4$ to $O_2$. The alkyd tint tone of the finished pigment is shown on the right-hand side of FIG. 2 and the consistency is shown as a function of tint tone in FIG. 3. The consistencies in FIG. 3 were measured after the pigments had been treated with a standard grinding and finishing procedure.

The reaction of titanium tetrachloride vapors with oxygen to form titanium dioxide is exothermic. In a completely adiabatic system, starting with 350° F. $TiCl_4$ vapor and 77° F. oxygen, a reaction temperature of about 2400° F. is attainable, which is above the minimum temperature of 2200° F. required to insure rutile as the dominant phase in the titanium dioxide product of reaction. The system of the present invention utilizes this heat of reaction to reduce the preheat requirement for a portion of the titanium tetrachloride vapors utilized.

Utilizing only the first reaction zone and assuming a flow of oxygen from oxygen preheat assembly of 60 pound moles per hour at a temperature level of about 1800° F. and assuming a flow of titanium tetrachloride from the titanium tetrachloride preheat assembly of 52 pound moles per hour at a temperature of about 1800° F., about 4150 pounds per hour of titanium dioxide are produced and the heat of reaction in the first reaction zone, assuming a completely adiabatic system will generate a temperature of above 2400° F.

Assuming an operation with a single reaction zone as mentioned above, the equipment associated with the first oxygen preheat and the titanium tetrachloride assembly already is in existence and the silica pipe heater portion of this equipment is relatively expensive equipment due to the corrosive nature of the titanium tetrachloride at the first temperature level of about 1800° F. In this situation, reactor 10 can be substituted for the single reaction zone reactor, additional equipment can be added to the oxygen preheat assembly to increase the capacity of such oxygen preheat assembly 14 so that about 120 pound moles per hour are preheated by oxygen preheat assembly 14, and the second oxygen preheat assembly 28 can be added for preheating oxygen to the second temperature level and for passing about 60 pound moles per hour into the second reaction zone. Under these conditions, about one-half of the oxygen will react with titanium tetrachloride in first reaction zone and the mixture including excess titanium tetrachloride will reach a temperature level of above 2400° F. due to the heat of reaction, assuming a completely adiabatic system. This mixture is passed from the first reaction zone into the second reaction zone wherein the excess titanium tetrachloride in the mixture will combine with oxygen at the second temperature which is being passed into the second reaction zone from secondary oxygen preheat assembly 28 and the temperature of this combined mixture will be above 1800° F., which is sufficient to sustain the oxidation reaction. Thus, the excess titanium tetrachloride in the mixture passed from the first reaction zone will react with oxygen at the second temperature in the second reaction zone to produce additional titanium dioxide product. Under these assumed conditions, reactor 10 will produce about 8300 pounds per hour of titanium dioxide product. Thus, utilizing reactor 10 of the present invention with two reaction zones, about twice the amount of titanium dioxide product is produced without the necessity of adding any additional titanium tetrachloride preheat equipment capable of heating titanium tetrachloride to the temperature level of about 1800° F. and in a manner wherein it only was necessary to add the secondary oxygen preheat assembly 28 which is capable of heating the oxygen to the desired lower temperature. Utilizing the system of the present invention, the capacity of a plant almost can be doubled without a corresponding doubling of the costs of equipment. A new plant could also be constructed for substantially less investment in equipment per pound of titanium dioxide produced.

In one embodiment, the walls of reactor 10 are cooled (fluid cooling) to protect the walls and to reduce titanium dioxide deposition on the walls. Also, other reagents, such as aluminum chloride and water vapor, are added through conduit 34 for controlling or modifying titanium dioxide pigment properties.

Further inlet points may be positioned such that oxygen may be added to the reaction stream at a point where any previously added titanium tetrachloride has not been substantially completely oxidized. This enables the oxygen which is added at the further inlet points to be at a lower temperature than that added at the first inlet point since the temperature necessary to initiate reaction is provided by the heat of reaction of the previously added titanium tetrachloride.

Oxygen is introduced into the reactor as an oxidizing gas stream which may comprise a gas containing a relatively low proportion of oxygen such as air but may also be substantially pure oxygen or another gas mixture such as oxygen-enriched air.

The primary oxidizing gas stream is usually preheated before introduction into the reactor to a temperature between about 1500° F. and about 1800° F., preferably between about 1650° F. and about 1750° F. Any suitable means can be used to achieve this temperature but the gas stream is conveniently heated by passing it through a hollow metal coil which is externally heated by a gas flame.

Titanium tetrachloride is introduced into the reactor at a temperature of at least about 572° F., preferably between about 572° F. and about 932° F. and, most preferably, about 662° F. and about 752° F. This temperature may be achieved, at least in part, by utilizing the heat of reaction of aluminum and chlorine which form aluminum chloride with which the titanium tetrachloride is admixed. Advantageously, titanium tetrachloride is first heated by passing it through a hollow coil formed from a metal such as Inconel which is externally heated by a gas flame, and subsequently passed to an aluminum chloride generator where it is mixed with aluminum chloride and heated to the chosen reaction temperature.

A number of types of aluminum chloride generators can be used in the process of the invention. For example powdered aluminum with or without an inert particulate material can be fluidized in a reactor by the upward passage of reactant chlorine and/or an inert gas. Alternatively, aluminum can be introduced into a stream of chlorine gas in particulate form but not necessarily sufficiently finely divided to fluidize in the gas stream. A fixed bed of particulate aluminum can also be chlorinated by passing chlorine into the bed through numerous nozzles surrounding the bed. Other methods include passing chlorine over molten aluminum or feeding two lengths of aluminum wire into a reactor in which they serve as consumable electrodes, a discharge being maintained between these electrodes in the presence of chlorine.

Titanium tetrachloride is mixed with aluminum chloride in such a way that the heat of reaction is used as a means of raising the temperature of the titanium tetrachloride. It may, for example, be passed into the aluminum chloride generator either separately or mixed with chlorine and may form part of the fluidizing gas in a fluid bed reactor. Alternatively it may be mixed with the hot aluminum chloride close to the exit from the generator. It is advantageous to heat the titanium tetrachloride to a temperature of between about 350° F. and about 400° F. and subsequently pass it to the aluminum chloride generator.

The proportion of oxygen which is introduced to the reactor at the first inlet point determines to some extent the conditions within the oxidation reactor and can therefore be varied to control these conditions. Usually at least about 15% by weight of the total oxygen feed will be introduced at the first inlet point and preferably the proportion added at the first inlet point is from about 20 to about 60% by weight of the total oxygen feed. Most preferably the proportion is from about 25 to about 50% by weight. The factor determining how much $O_2$ is fed to the first $O_2$ inlet is determined by how much $TiCl_4$ is fed to the first $TiCl_4$ inlet. The ratio of $TiCl_4$ to $O_2$ is the one that controls size.

The quantity of oxidizing gas stream introduced also depends upon the proportion of oxygen present in the gas stream. There must be sufficient oxygen to fully oxidize the total amount of titanium tetrachloride introduced and usually there is more oxygen than is stoichiometrically needed. Typically, the oxidizing gas stream will provide at least about 5% by weight and preferably about 10% by weight more oxygen than is required to completely oxidize the titanium tetrachloride.

Aluminum chloride is present in the titanium tetrachloride to act as a rutilization agent, that is, to promote the formation of rutile titanium dioxide. Normally, the quantity of aluminum chloride used is sufficient to produce between about 0.3% and about 1.5% $Al_2O_3$ by weight in the product titanium dioxide. Preferably, the amount used produces from about 0.5% to about 0.8% $Al_2O_3$ by weight in the product titanium dioxide. The amount of $Al_2O_3$ is dependent on pigment grade being produced. Low durability pigments use little $Al_2O_3$.

The process of this invention is operated at a pressure above atmospheric pressure. Preferably, the pressure in the reactor during oxidation is at least about 0.15 MPa above atmospheric pressure and most preferably is from about 0.2 MPa to about 0.5 MPa above atmospheric pressure.

The distance between the first inlet point and a second inlet point and between any further inlet points is governed by the rate of feed of the titanium tetrachloride and the oxidizing gas streams at the previous inlet points. Advantageously the $TiCl_4$ to $O_2$ ratio at the start of the reaction is from about 0.5:1 to about 1.2:1. Preferably the $TiCl_4$ to $O_2$ ratio at the start of the oxidation reaction is from at least about 0.65:1 to about 1.2:1. Ideally a portion of the oxygen introduced at the first inlet point will be reacted, i.e., a sufficient amount of particle nucleation and rutilization has taken place, before the reactant gas stream reaches the zone of the reactor adjacent to the second inlet point. Hence the walls are cooled to keep from forming hard accretions. No heat loss would likely be best. The second inlet point can be located at any distance between the DSO and the first slot and the size will not be affected.

Usually, the reactors used for the process of this invention have a generally tubular shape and a portion of the oxidizing gas flow is introduced at one end. The titanium tetrachloride inlet point is close to the end where the oxidizing gas flow is introduced and is introduced through an injector of the type conventionally used for titanium tetrachloride oxidation reactors. For example, the injector may comprise a circumferential slot in the wall of the reactor, an arrangement of perforations in the reactor wall which may extend axially along the reactor, a single jet or nozzle or an arrangement of jets or nozzles.

Any pipework and associated equipment used to conduct the mixture of titanium tetrachloride and aluminum chloride from the aluminum chloride generator to the first inlet point will usually be formed from a ceramics material to minimize corrosion. Corrosion of the reactor used for the process of the invention can also be reduced by constructing the first inlet point and the walls between the first inlet point and the second inlet point from a ceramics material.

Additives conventionally used in the oxidation of titanium tetrachloride can be used in the process of this invention. For example alkali metal salts may be added to control the crystal size of the titanium dioxide produced. Preferably the alkali metal salt is a potassium salt which can be added as potassium chloride to the oxidizing gas stream before the first inlet point. The amount of potassium chloride added may be from about 400 ppm up to about 600 ppm, but preferably the amount added is more than about 0.5 to about 20 ppm potassium with respect to $TiO_2$ formed. A scouring agent such as sand or titanium dioxide can also be added to help prevent fouling of the reactor walls.

The invention provides an easily controllable process for the oxidation of titanium tetrachloride with minimum contamination of the product titanium dioxide and without the use of inflammable liquids. The introduction of all the aluminum chloride with the titanium tetrachloride added at the first inlet point generally leads to easy rutilization of the titanium dioxide formed.

The crystal size of the product titanium dioxide can also be adjusted by adjusting the temperature at the first inlet point and/or the pressure in the reactor.

EXAMPLE 1

Tests were performed with cold secondary oxygen, with hot secondary oxygen, and with plasma heated secondary oxygen.

Figure 4:
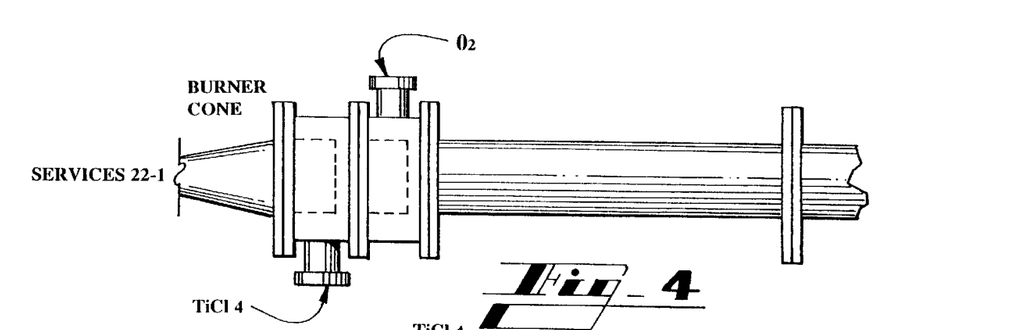
FIG. 4 is a diagrammatic view showing one embodiment of the system of the present invention.
Figure 5:
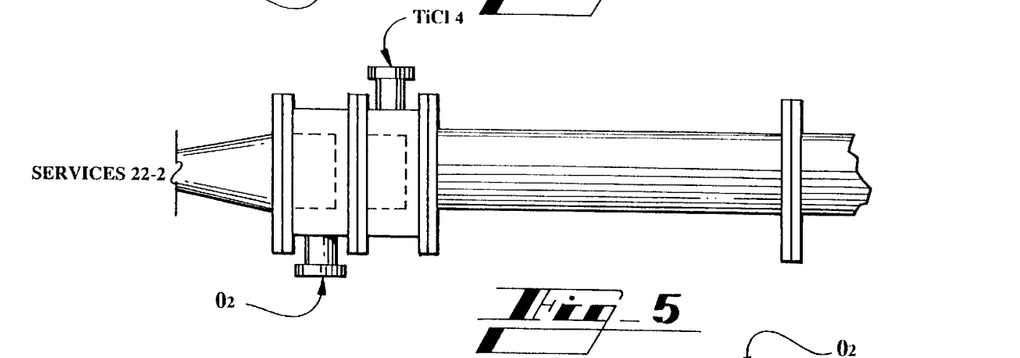
FIG. 5 is a diagrammatic view, similar to FIG. 4, showing another embodiment of the present invention.
Figure 6:
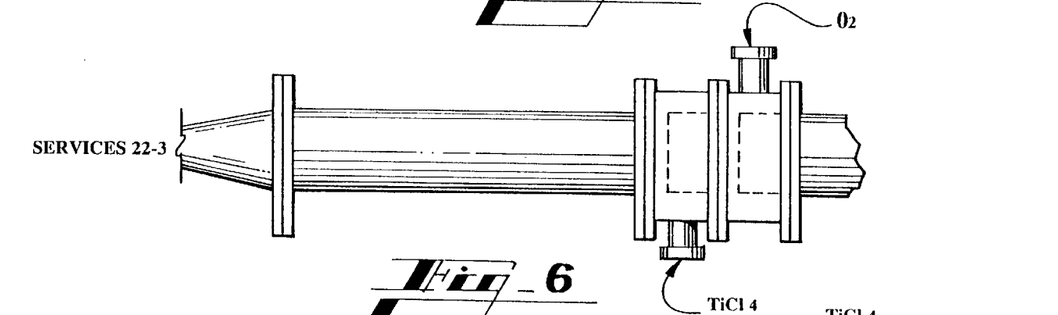
FIG. 6 is a diagrammatic view, similar to FIG. 4, showing another embodiment of the present invention.
Figure 7:
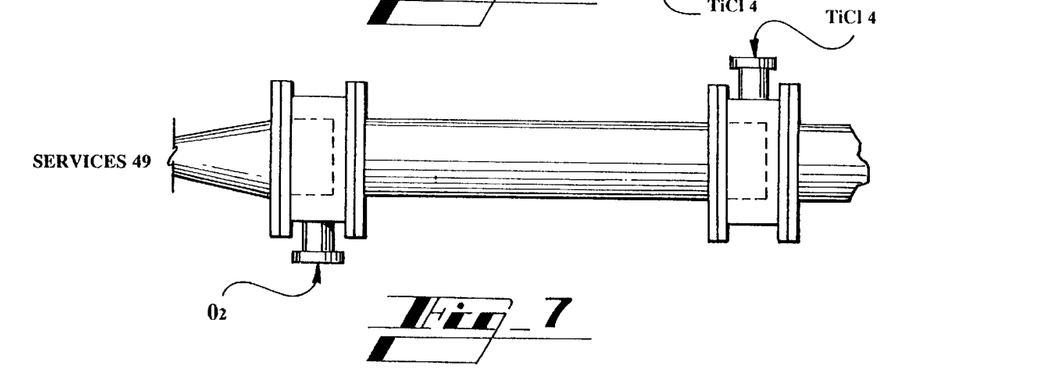
FIG. 7 is a diagrammatic view, similar to FIG. 4, showing another embodiment of the present invention.

Series 22. This test was run with cold secondary oxygen. The base pigment produced was Kerr-McGee Chemical Corporation (KMCC) CR 813. The raw pigment had about 0.5 percent $Al_2O_3$ and there was no potassium injection. Configurations for the oxidizer as shown in FIGS. 4, 5 and 6 were tested. The CBU of the raw pigment as a function of the primary $TiCl_4$ to primary $O_2$ ratio is shown in FIG. 2.

Series 24. This test series was similar to Series 22 except potassium was added at the dual slot oxidizer (DSO) and methane was added with the secondary $TiCl_4$. The results of this test are shown in FIG. 2. The two points with $TiCl_4$ to $O_2$ ratios of about 1.2 and CBUs of about −3 were obtained by adding a secondary methane flow in an attempt to improve rutilization.

Series 27. This test was performed while producing commercial $TiO_2$. One bulk sample was produced with a latex tint tone of −4.2 and a gloss of about 72 when finished with intense grinding. The primary $TiCl_4$ to primary $O_2$ ratio used was about 0.8 and the CBU of the sample was about −2.2. The CBU of a sample produced with a ratio of about 1.02, but not finished was −1.42 suggesting a finished tint tone of about −4.1 or lower. The intense milling was performed to determine whether the more positive CBU was due to larger particles or to agglomeration. The results indicated the raw pigment could be ground to a stable size before finishing and that the pigment was relatively easy to filter. This indicates the raw pigment was large particles rather than agglomerates.

Series 49. The three previous test series indicated that the rutilization decreased slightly with the use of cold secondary oxygen. In this test, the oxygen flow was split so that two-thirds of the $O_2$ was fed upstream of the primary $TiCl_4$ slot and one-third was fed at the end of the cone. The DSO was located about three feet downstream from the secondary $O_2$ injection slot. The oxidizer configuration for this test is also given in FIG. 6. Two bulk samples from this test configuration and two samples from a control oxidizer were finished. The tint tones were −3.2 for the samples with secondary oxygen and about −4.2 for the control samples. All other properties of the finished pigments appeared to be about the same.

Series 57 and 58. Plasma was used to heat the secondary oxygen for these tests. The main objective of the tests was to increase rutilization relative to that possible using oxygen heated with a heat exchanger. The pigment produced had positive CBUs as in other cases using secondary $O_2$ with the rutilization being equivalent.

The CBU of the raw pigment increased as the ratio of $TiCl_4$ to $O_2$ increased at the front of the oxidizer in FIGS. 2 and 3. The slope of the line increases rapidly in moving from FIG. 2 through FIG. 3. This suggests that another variable such as the increase in production rates or the position of the potassium injection has increased the effectiveness of the secondary oxygen. The data in FIG. 2 was obtained for a KMCC CR 813 raw pigment indicating that there was no potassium injection, the data in FIG. 3 was obtained with potassium injected at the DSO. The ratio of primary to secondary $TiCl_4$ injection was 0.5 for the data in FIG. 2 and FIG. 3 indicating that the Rsp was not the variable affecting the dependence of CBU on the $TiCl_4$ to $O_2$ ratio.

Test Configuration

A description of the equipment and the basis for the design is provided below in the Experimental Configuration and Summary of Calculations and a schematic showing the oxygen flow control is given in FIG. 1. The primary $O_2$ and the $TiCl_4$ was fed to the oxidizer as is current practice. However, the primary $O_2$ flow was split and a measured part of the oxygen flow sent through a preheater to second $O_2$ slot located immediately downstream of the second $TiCl_4$ slot. The secondary $O_2$ flow rate was measured while the $O_2$ was cold and then sent to a preheater where its temperature was controlled. It was possible to control particle size using the system shown schematically in FIG. 1.

The configuration for the oxidizer is basically the same as shown in FIG. 4. FIG. 3 results indicate the configuration of the oxidizer does not have a major effect on the pigment properties but the DSO and secondary oxygen spool was less affected by abrasion if the spools were further downstream than in FIG. 4 or 5. Initially potassium was added at the end of the cone but several samples were collected with potassium added at the DSO, particularly if rutilization was low or the CBU was not positive enough. The secondary oxygen preheater was installed on a 6-inch line, and the control line, was also a 6-inch line. The test line and control line were operated as near full capacity as possible.

The oxygen preheater must be capable of preheating about one half the total oxygen normally fed to a 6-inch oxidizer to 1,900° F. An objective of the test was to determine the minimum temperature of the secondary oxygen required for acceptable rutilization at each alumina level.

Test Procedures

A detailed discussion of the test procedures is provided below in the Experimental Procedures—Test Series 62. Three sets of tests were performed. Each set was at a different coburned $Al_2O_3$ level. The lower level was at approximately 0.5 percent and the higher level was at about 1.2 percent coburned $Al_2O_3$. The third series was intermediate between these levels. The primary $TiCl_4$ to primary oxygen ratio was varied from the minimum level required to protect the heat exchanger tubes and keep the secondary oxygen slot open (about 0.6) to a maximum $TiCl_4$ to $O_2$ ratio of about 1 at the front of the oxidizer. Depending on the rate of change either two or three intermediate samples were collected. Bulk samples were collected from a control line, at the start of the test series and the end of the test series.

The Rsp for the initial test was set at about 0.2 to 0.25 with tests being made to determine whether it could be increased with high secondary oxygen flows. The amount of propane required to operate the oxidizer per unit of $TiO_2$ produced increased for the 6-inch oxidizer relative to a 4-inch oxidizer. Some of the additional propane required was because of the water cooled parts of the oxidizer upstream of the primary $TiCl_4$ slot and some of the additional propane required was because the $TiCl_4$ Rsp had decreased.

Temperatures were measured during the tests to obtain axial profiles along the length of the tube and to obtain a radial temperature profile with $O_2$ streams that were independently controlled and heated at the end of the cone for each different $TiCl_4$ to $O_2$ ratio.

All the bulk samples from this test series were finished.

EXPERIMENTAL CONFIGURATION

The primary purpose of the secondary oxygen addition was to develop a method yielding improved raw pigment properties. The pigment particles produced were larger and thus the finished pigments had a more positive tint tone. The pigments produced with secondary oxygen were less aggregated than pigment produced using the prior art oxidizer configuration by virtue of the fact that the pigment gets larger by coalescing. Some aggregation was likely present as a result of interactions of the pigment particles on the wall of the oxidizer. Secondary oxygen does not reduce aggregation that occurs as a result of such interactions. The reasons particles coalesce to a larger size with secondary oxygen are likely because rutilization of the particles occurs more slowly and because the initial concentration of $TiCl_4$ is higher. Analysis of the results indicated that the main variable affecting raw pigment CBU is the $TiCl_4$ to $O_2$ ratio at the primary slot.

Oxidizer Configuration

The configuration of the oxidizer injection slots is as shown in FIG. 6. The secondary oxygen was heated in a heat exchanger consisting of a radiant section with three identical helical coils and a convection section at the top consisting of a number of J tubes welded together. The unit was designed to deliver 330 scfm of heated oxygen at temperatures as high as 1900° F.

The temperature of the oxygen in the front of the oxidizer was higher for the secondary oxygen tests than for normal operation because the amount of $TiCl_4$ per unit of oxygen is higher. This higher temperature came from using a greater amount of propane per unit of oxygen for supported combustion at the sand scour nozzle. The propane to $TiCl_4$ ratio required to reach the same mix temperature is therefore about the same.

EXPERIMENTAL PROCEDURES—Test Series 62

Procedures

The objective of this series of tests was to determine the effect of different $TiCl_4$ to $O_2$ ratios at the primary slot on raw pigment properties. The ratio of $TiCl_4$ to $O_2$ was varied from about 0.6 to about 1.0 with $Al_2O_3$ compositions varying from about 0.5 percent to about 1.2 percent. The lower value of the $TiCl_4$ to $O_2$ ratio was determined by the minimum value required to keep the secondary oxygen slot from plugging. The maximum ratio was the ratio that would not result in a decrease in particle size or a decrease in CBU with an increase in the ratio.

The test series was divided into three subseries. The test series and major variables in the test were as follows:

Series 62-1. Raw pigment with an $Al_2O_3$ content of 0.5 percent was produced in this test series. The oxidizer was started at the flutter point at the start of each test, the Rsp was set at 0.2 to 0.25, and the secondary oxygen fed to the oxidizer at 1700° F. The first test was at the minimum $TiCl_4$ to $O_2$ ratio, the RTO, and the final test of this subseries was at a ratio of about 1. Two or three tests were performed at intermediate ratios. Tube samples were taken to evaluate each operating condition. If the rutilization was below about 98.3, the amount of propane used for supported combustion was increased by 1 scfm. The amount of propane was increased by up to 4 scfm until it was obvious that increasing the amount of propane did not increase rutilization. The secondary $O_2$ temperature was then raised in 100° F. increments until the temperature reached 1900° F. or acceptable rutilization was attained. If the percent rutile was above 99.6 percent, the $TiCl_4$ to $O_2$ ratio was increased to approximately 1.0 and if the rutilization remained high the secondary oxygen temperature was decreased in 100° F. increments to determine the minimum preheat required to attain 100 percent rutilization. Once this temperature was determined for an RTO of 1.0, the ratio was decreased incrementally to the minimum value described. When this sequence of tests was completed, the Rsp was increased to about 0.3 to 0.35 to determine if conditions could be found that would produce approximately 100 percent rutilization and no $TiCl_4$ slip.

Series 62-2. This test series was similar to Series 62-1 except it was performed while producing a raw pigment with about 1.2 percent coburned $Al_2O_3$. The temperature of the secondary oxygen was set lower than 1900° F.

Series 62-3. A series of tests at an intermediate $Al_2O_3$ level of about 0.8 percent was performed using the same sequence as for Series 62-1 and 62-2.

Small samples collected while the unit was operating under steady conditions were used to determine the process variability of an oxidizer running with secondary $O_2$.

What is claimed is:

1. A process for the production of titanium dioxide comprising reacting titanium tetrachloride with oxygen at a pressure at atmospheric pressure or above and at a reaction temperature of at least about 1290° F. in an oxidation reactor, the oxygen being introduced into the reactor at a first inlet point before any titanium tetrachloride is introduced and at least one further inlet point, the titanium tetrachloride introduced into the reactor being heated to a temperature of less than about 800° F. prior to introduction and the ratio of titanium tetrachloride to oxygen at the start of the oxidation reaction being between at least about 0.65 and about 1.2.

2. The process of claim 1 wherein the titanium tetrachloride introduced into the reactor is an admixture with aluminum chloride, the aluminum chloride being formed by reaction of aluminum and chlorine and the heat generated by this reaction being used to heat the titanium tetrachloride introduced into the reactor.

3. The process according to claim 1 in which oxygen introduced at the first inlet point is preheated before introduction into the reactor to a temperature between about 1500° F. and about 1800° F.

4. The process according to claim 3 in which said oxygen is preheated to a temperature of about 1750° F.

5. The process of claim 1 in which the ratio of titanium tetrachloride to oxygen at the start of the oxidation reaction is about 1.1.

6. The process according to claim 2 in which titanium tetrachloride is first heated to a temperature between about 350° F. and about 400° F. before being passed to an aluminum chloride generator.

7. The process according to claim 1 in which oxygen introduced at the second inlet point is heated to a temperature between about 500° F. and about 1600° F.

8. The process according to claim 1 in which the oxygen is introduced into the reactor as air or oxygen-enriched air.

9. The process according to claim 2 in which the aluminum and chlorine are reacted in a fluid bed reactor.

10. The process according to claim 9 in which titanium tetrachloride forms part of the fluidizing gas in the fluid bed reactor.

11. The process according to claim 2 in which titanium tetrachloride is mixed with hot aluminum chloride close to the exit of an aluminum chloride generator.

12. The process according to claim 7 in which at least about 15 percent by weight of the oxygen is introduced at the first inlet point.

13. The process according to claim 12 in which from about 20 to about 60 percent by weight of the oxygen is introduced at the first inlet point.

14. The process according to claim 13 in which from about 25 to about 50 percent by weight of the oxygen is introduced at the first inlet.

15. The process according to claim 1 in which the total amount of oxygen introduced is equivalent to at least about 5 per cent by weight more than is required to completely oxidize the titanium tetrachloride.

16. The process according to claim 15 in which the total amount of oxygen introduced is at least about 10 percent by weight more than is required to completely oxidize the titanium tetrachloride.

17. The process according to claim 2 in which aluminum chloride is introduced in an amount sufficient to produce between about 0.3 and about 1.5 percent by weight $Al_2O_3$ in the product titanium dioxide.

18. The process according to claim 17 in which the amount of aluminum chloride is sufficient to produce from about 0.5 to about 0.8 percent by weight $Al_2O_3$ in the product titanium dioxide.

19. The process according to claim 1 in which the reactor is operated at a pressure at least about 0.15 MPa above atmospheric pressure.

20. The process according to claim 19 in which the pressure in the reactor is between about 0.2 MPa and about 0.5 MPa above atmospheric pressure.

21. The process according to claim 1 in which a potassium salt is added to oxygen introduced at the first inlet point before mixing with the titanium tetrachloride, the potassium salt being added in an amount equivalent to from about 400 ppm to about 600 ppm potassium chloride by weight with respect to the titanium dioxide product.

22. The process according to claim 21 in which the amount of potassium is equivalent to more than about 20 parts per million by weight with respect to titanium dioxide product.

23. The process according to claim 1 in which the walls of the reactor are cooled.

24. The process according to claim 23 in which the walls of the reactor are cooled by providing a purge of nitrogen or chlorine gas.

25. The process according to claim 1 in which at least one of the inlet points comprises a circumferential slot in the wall of the reactor.

26. The process according to claim 2 in which the mixture of titanium tetrachloride and aluminum chloride is conducted to the reactor by means of pipework constructed from a ceramics material.

27. The process according to claim 1 in which the walls of the reactor between the first inlet point and the at least one further inlet point are constructed from a ceramics material.

* * * * *